United States Patent [19]

Whittaker et al.

[11] Patent Number: 4,794,430
[45] Date of Patent: Dec. 27, 1988

[54] SOLID STATE RETICLE PROJECTOR FOR A WEAPON SIGHT

[75] Inventors: Thomas F. Whittaker, Bedford; Wayne E. Isbell, Dallas; Peter Sorensen, III, Garland, all of Tex.

[73] Assignee: Varo, Inc., Garland, Tex.

[21] Appl. No.: 44,007

[22] Filed: Apr. 29, 1987

[51] Int. Cl.⁴ .................. G02B 27/34; G02B 27/36
[52] U.S. Cl. .................. 356/252; 340/705; 340/767; 340/782
[58] Field of Search .......... 356/251, 252; 350/562, 350/565, 566; 340/705, 767, 782, 815.27

[56] References Cited

U.S. PATENT DOCUMENTS

| | | |
|---|---|---|
| 3,824,581 | 7/1974 | Ohno . |
| 4,114,366 | 9/1978 | Renner et al. ............ 340/767 X |
| 4,274,092 | 6/1981 | Vonusa et al. . |
| 4,404,890 | 9/1983 | McAlpine . |
| 4,542,986 | 9/1985 | Berdanier ............ 250/334 X |
| 4,567,478 | 1/1986 | Schwab . |

FOREIGN PATENT DOCUMENTS

1496155  12/1977  United Kingdom ............ 356/252

Primary Examiner—Davis L. Willis
Assistant Examiner—Matthew W. Koren
Attorney, Agent, or Firm—Jerry W. Mills

[57] ABSTRACT

Disclosed is a reticle generator having an azimuth array (64) of light emitting diode filament lines and an elevation array (66) of orthogonal light emitting diode filament lines. The arrays (64, 66) are fixed by rigid bracket members (136, 144) with respect to the faces (74, 80) of a partially reflecting prism (76). An illuminated LED filament line projected into the prism (76) by azimuth array (64) is reflected by the partially reflecting surface (82), and emitted from prism face (84). A selected LED filament (78) from elevation array (66) is transmitted through the prism (76) and emitted from face (84) and thus superimposed with the azimuth filament line (72).

14 Claims, 5 Drawing Sheets

SOLID STATE RETICLE PROJECTOR FOR A WEAPON SIGHT

TECHNICAL FIELD OF THE INVENTION

The present invention relates in general to weapon fire control systems, and more particularly relates to gun sight reticles.

BACKGROUND OF THE INVENTION

Recent technological advancements in weapons systems have led to more effective munitions, and new methods of firing or deploying such munitions. Computerized weapon sighting systems have also been developed to provide rapid solutions to ballistic problems so that a trajectory path to a target can be computed, and a gun aimed accordingly. Such sophisticated computerized weapon sighting systems are also able to aim or position the weapon appropriately so that the accuracy of a hit on the target is optimized. Exemplary of such types of fire control systems are U.S. Pat. Nos. 3,575,085; 3,689,741; 4,318,330; 4,312,262; 4,418,361 and 4,528,891.

In the more sophisticated weapon sighting systems, a gunner or operator can view both a target and superimposed thereon an indication of the position of the weapon or gun barrel. The gun position indication is generally cross hairs or a reticle. In this manner, a gunner or operator need only view a single display, and yet be able to maintain the weapon trained on the target, even though the target may be moving.

As noted, the positional indication of a weapon is normally a reticle which has a vertical scale and an intersecting horizontal scale. The reticle is similar to cross hairs, the intersection of which indicates the exact position in which the weapon must be aimed in order for the projectile to hit the target. Various approaches have been taken to generate and superimpose a weapon sighting reticle on the target. In military armament, such as tanks, the weapon sighting system is normally periscope-type equipment. In this type of system, the weapon is aimed directly at the target, without regard to azimuth, windage, atmospheric conditions or the type of projectile. A computer then solves a ballistic equation by using the noted variables, and provides a solution related to the direction in which the weapon should be directed in order for the projectile to hit the target. In accordance with the solution of the ballistic equation, one of the mirrors in the periscope arrangement is tilted so as to displace the reticle with respect to the target. The gunner simply moves the gun so that the target and reticle are again aligned, whereupon a projectile fired from the newly positioned weapon will follow the correct trajectory. The disadvantage with this approach is that the mirror in the periscope apparatus must be gimballed and controlled with gyroscopes which require maintenance, are delicate and susceptible to damage, and are costly.

Another approach used in weapon sighting systems for superimposing a gun sight reticle on a target is illustrated in U.S. Pat. Nos. 4,318,330; 4,312,262 and 4,418,261. In sighting systems of this type, a cathode ray tube (CRT) is utilized to generate a reticle at any position on the CRT face. An optical system is employed to superimpose an image of the reticle on a target image. To aim the weapon, the computer drives the CRT according to the solution of a ballistic equation to displace the reticle on the CRT face. The reticle image is thus also displaced with respect to the target so that the gunner can reposition the weapon and realign the target and reticle image. In the practical application of the CRT sighting system, continued readjustment is required to maintain the weapon correctly calibrated with the fire control system. This is mainly due to vibration and temperature affects on the CRT equipment which affect the deflection system thereof and thus cause instability problems.

In other types of weapon slighting systems, the reticle is constructed using a mechanical vertical and horizontal needle, each mechanically moveable under control of the computer to change the position of the cross hairs. Again, by virtue of the mechanical apparatus involved, reliability is of critical concern.

From the foregoing it can be seen that a need exists for an improved reticle generation system which is economical, reliable, durable and thus not susceptible to damage, nor require periodic maintenance.

SUMMARY OF THE INVENTION

In accordance with the present invention, the disclosed reticle projection system reduces or eliminates the disadvantages and the shortcomings associated with prior art devices. According to the invention, an economical and reliable solid state reticle generator is disclosed.

In the preferred form of the invention, a light emitting diode (LED) array of filament lines is arranged on a semiconductor substrate. A similar LED array, also with a plurality of filament lines is arranged on another semiconductor substrate, and fixed at a right angle with respect to the other LED array. The one LED array thus provides a number of horizontal filament lines, one of which can be illuminated to provide an elevation reticle line, while the other LED array provides a number of vertical filament lines, one of which can be illuminated to provide an azimuth reticle line. A decode circuit is responsive to an output of a weapon fire control processor for accessing the azimuth and elevation arrays to illuminate a single filament line in each array. By illuminating different lines of the arrays, the crosshairs thereof can be moved about, as desired.

The LED azimuth and elevation arrays are fixed with respect to an optical partially reflecting prism so that an illuminated azimuth array line and an illuminated elevation array line are combined or superimposed to form a reticle image which has intersecting crosshairs. The optical system also includes various imaging lenses and a relay prism for directing the reticle image to other equipment where the target image and the reticle image are combined. The reticle image is thereby superimposed on the target image. According to computed solutions of a ballistic equation, the weapon system processor outputs signals to the reticle generator. The signals are decoded by decode circuits so that the desired azimuth and elevation lines of the respective LED arrays are illuminated, thereby placing the intersection thereof at the correct position and superimposing the gunsight position over the target image. The gunner can then reposition the weapon to align the reticle image intersection over the target image to assure that the projectile will follow the path, as computed by the weapon control processor, to hit the target.

A duty cycle controlled brightness adjustment is provided to adjust the brightness of the illuminated array lines to different intensities. This is advantageous in military operations at night. The intensity of the reticle image can be matched to that of the target image so that the reticle image does not flood out the target image.

BRIEF DESCRIPTION OF THE DRAWING

Further features and advantages will become more apparent from the following and more particular description of the preferred embodiment of the invention, as illustrated in the accompanying drawings in which like reference characters generally refer to the same parts throughout the views, and in which.

DETAILED DESCRIPTION OF THE INVENTION

Figure 1:
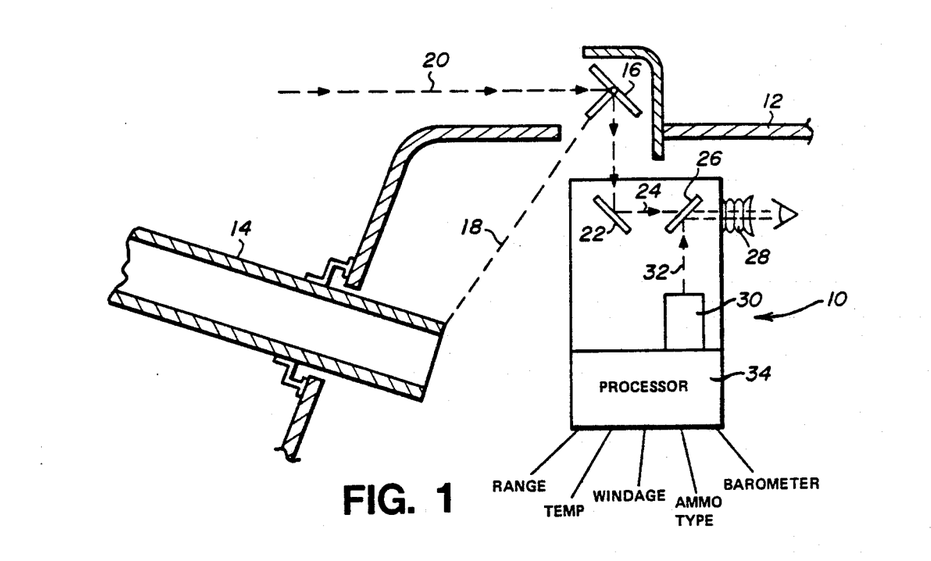
FIG. 1 is diagrammatic illustration of a weapon control system, as utilized in a military application.

Referring first to FIG. 1, there is shown a typical application in which the invention may be advantageously practiced. A gunner's sight 10 is shown utilized in connection with a military armored tank 12 having a weapon or gun 14. The gunner's sight 10 is shown in connection with periscope-type gun sight apparatus having a head mirror 16 for redirecting a target image into the gunner's sight 10. The head mirror 16 is made pivotable for following the movement of the gun 14. A conventional linkage, shown as a broken line 18, functions to couple the movement of the gun barrel 14 to the head mirror 16. The target image is directed along an image path 20 into the head mirror 16 where it is redirected downwardly into the optical system of the gunner's sight 10.

The gunner's sight 10 includes a reflective mirror or surface 22 for redirecting the target image along a horizontal optical path 24, through a partially reflective mirror or prism 26 and exiting through an eyepiece 28 where it can be observed by a gunner. A reticle generator and projector 30 also comprises a part of the gunner's sight 10, and is located so that the reticle image is directed along as optical path 32 where it is reflected by the partially reflecting mirror 26 and directed into the eyepiece 28. As viewed through the eyepiece 28, the target image carried by the optical path 24 and the reticle image carried by the optical path 32 are superimposed one on the other. A conventional fire control processor 34 operates in conjunction with the gunner's sight 10 to calculate a solution to a ballistic equation including variables such as the range to the target, the temperature, windage, barometric and other atmospheric conditions, and the ammunition type. Other variables may also be employed depending on the particular ballistic equation used. Such ballistic equations are well known in the art and need not be further delineated here.

Figure 2:
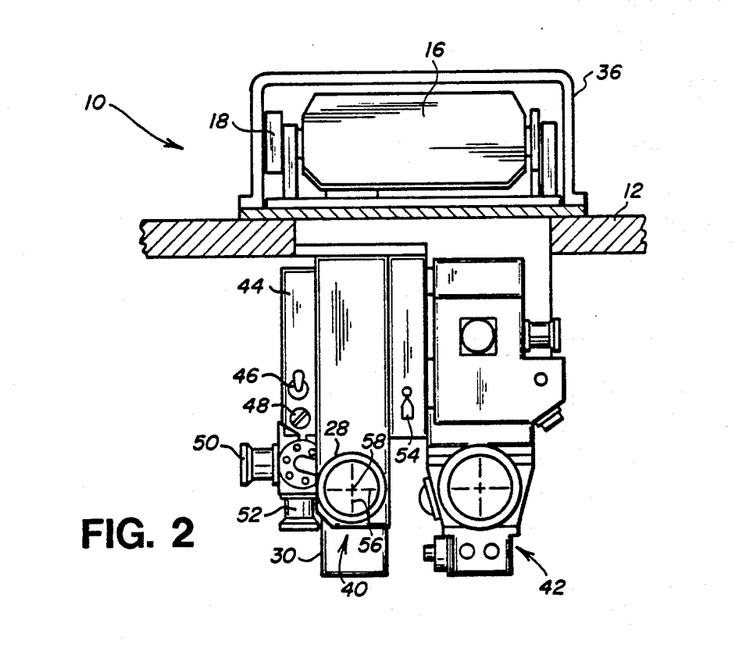
FIG. 2 is a planar back view of a gun sight embodying the invention.

FIG. 2 is a detailed illustration of a typical gun sight 10 of a fire control system with which the present invention can advantageously be used. The head mirror 16 is pivotally mounted about a horizontal axis for rotation according to the position of the gun 14. The linkage 18 is connected to the head mirror 16 for effecting such pivotal movement. The head mirror 16 is protected within a ballistic shield 36 which is mounted to the tank armor 12. The gun sight 10 includes a day sight eyepiece 40 and a night sight eyepiece 42. The night sight eyepiece 42 includes night vision equipment for facilitating the observance of objects during night. Incorporated within the day sight 40 and the night sight 42 is a laser ranging unit 44 for determining the distance between a target and the tank 12. The laser ranging unit 44 is controlled by a first/last return select switch 46 and a laser key switch 48. The gun sight 10, as described above, is conventionally available. Fixed below the gun sight 10 is a housing for containing the reticle generator 30 of the invention. The reticle image is optically coupled into the laser ranging unit 44 in a manner as described below.

The gun sight 10 is boresighted by the use of an azimuth control 50 and an elevation control 52. A filter select switch 54 is effective to switch various filters within the optical path of the day sight equipment 40. For example, various filters may be utilized during extreme bright conditions and other filters may be used during hazy or dim conditions. The night sight portion of the gun sight 10 may be equipped with comparable equipment.

In a typical application of the gun sight 10 of the invention, the gun 14 is boresighted by using a gun scope (not shown) aligned with the gun barrel 14 to direct the gun barrel 14 at an exemplary object about 1200 feet away. The azimuth and elevation controls 50 and 52 are adjusted to align a reticle 56 with a special target reticle 58 used only during the boresighting procedure. After the weapon has been boresighted, it is assured that the gun sight 10 is properly adjusted with respect to the positional orientation of the gun barrel 14. Thus, once the weapon has been boresighted, no adjustments are required thereafter, except for periodic verification.

Figure 3:
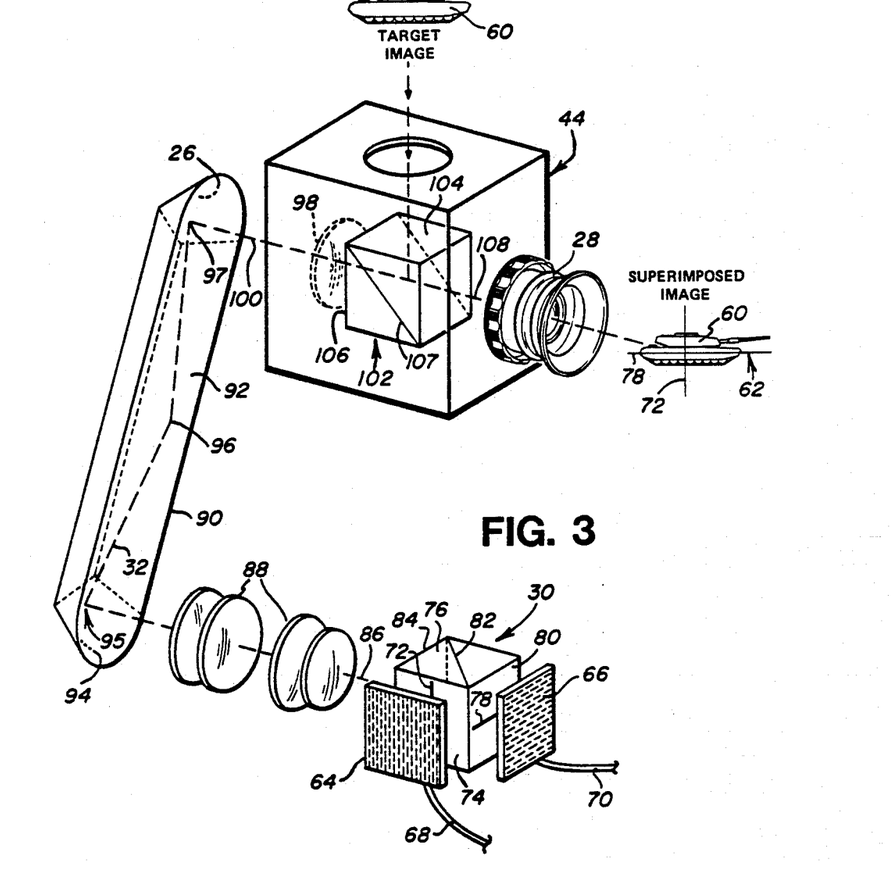
FIG. 3 is a perspective view of the optical apparatus of the reticle projector of the invention.

With reference now to FIG. 3, there is shown the optical path of the system, in which a target image 60 is superimposed with a reticle image 62. The reticle generator 30 comprises a light emitting diode azimuth array 64 with plural vertical filament lines, and a light emitting diode elevation array 66 with plural horizontal filament lines. The azimuth array 64 is driven to select a single vertical line corresponding to a desired azimuth position, while the elevation array 66 is driven to select a single horizontal line corresponding to a desired elevation position. The arrays 64 and 66 are electrically controlled by wire buses 68 and 70 for selecting and illuminating one vertical filament line in the azimuth array 64 and one horizontal filament line in the elevation array 66. A selected vertical line 72 is projected on one side 74 of a partially reflecting prism 76, while a selected horizontal line 78 is projected on another face 80 of the prism 76. The selection of a filament line in each of the arrays 64 and 66 is accomplished by illuminating desired lines in the arrays. The prism 76 is square, with faces 74 and 80 oriented at right angles. The azimuth and elevation arrays 64 and 66 are oriented in a corresponding manner and rigidly fixed adjacent to the respective prism faces 74 and 80.

The partially reflective prism 76 is constructed of an optical quality glass, with a partially reflecting surface 82 disposed diagonally within the square prism 76. With this arrangement, the light emitted by the selected horizontal reticle line 78 is transmitted through the prism face 80 and exits an opposing prism face 84. On the other hand, light emitted by the selected vertical reticle line 72 is projected into prism face 74, reflected from the partially reflecting surface 82, and also emitted from prism face 84. As a result, the reticle image emitted from the prism 76 along the optical path 86 comprises a reticle image having superimposed vertical and horizontal lines.

In accordance with the invention, and to be described in more detail below, the azimuth and elevation reticle arrays 64 and 66 each include eighty LED filament lines, selectable independently of each other so that any one line of the azimuth array 64 can be superimposed together with any one line of the elevation array 66. Thus, the intersection, or cross hairs of the reticle lines can be placed at any position in the field of view of the target image 60.

Disposed in an optical path 86 of the reticle image 62 are various imaging lenses 88, and a 180° relay prism 90. The relay prism 90 includes a flat frontal face 92, an internally reflective end surface 94 and an opposing internally reflective surface 26. The reflective end surfaces 94 and 26 are angled at about 40.5° so that at a first reflection 95, the reticle image is redirected along the optical path 32. After two additional internal reflections, such as noted by reference numerals 96 and 97, the reticle image 62 is reflected from end surface 26. The reticle image is then redirected along an optical path 100 and exits the relay prism 90. The reflective surfaces 26 and 94 should be silver coated. Because the angle of incidence of reflection at point 96 is large, total internal reflection is obtained without the use of a reflective coating thereat. One or more additional imaging lenses 98 may be placed in the optical path 100 for further conditioning and correction of the reticle images as it enters the laser ranging unit 44. In practice the reticle generator 30 and associated lenses and prisms disposed in the noted optical path are housed and fixed to the ranging unit 44.

The laser ranging unit 44, which is part of the gunner's sight 10, optically combines the reticle image 62 with the target image 60. The target image 60 is coupled from the periscope equipment into the ranging unit 44 from above. The reticle image 62 is coupled into the ranging unit 44 from the front side thereof. A partially reflecting prism 102 is fixed within the ranging unit 44 at a location where the target image 60 and the reticle image 62 are incident on right angle surfaces thereof. As shown, the target image 60 is directed downwardly on the top surface 104 of the prism 102, while the reticle image 62 is directed to the left-hand side surface 106 thereof.

The prism 102 includes an internal diagonal oriented partially reflective surface 107 which is constructed and arranged so that the target image 60 is reflected and redirected along an optical path 108, while the reticle image 62 passes through the surface 107 and is thus combined with the target image along the optical path 108. The target image 60 and the reticle image 62 are thus superimposed together and appear as shown in FIG. 3 as a composite image shown in FIG. 3 exiting from the eyepiece 28. It can be appreciated that other techniques can be utilized for optically combining the target image and the reticle image.

A gunner looking through the eyepiece 28 can thereby observe the reticle image 62 superimposed on the target 60. It should be noted that by selecting various azimuth array lines and elevation array lines, the intersection thereof can be positioned as desired with respect to the target image 60.

Figure 4:
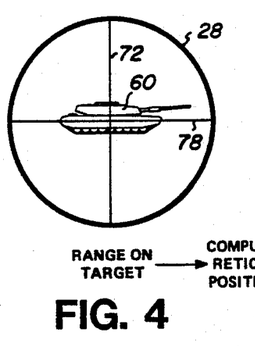
FIGS. 4–6 are diagrammatic illustrations of images typically observed during the operation of the fire control system embodying the invention.
Figure 5:
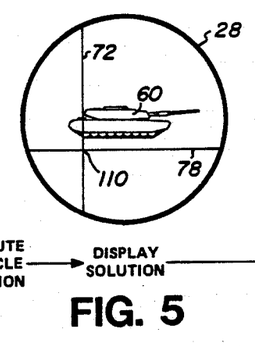
Figure 6:
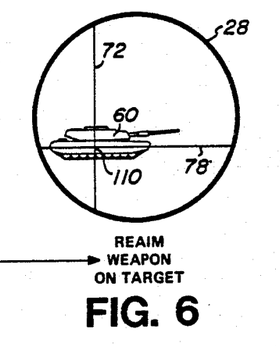

A typical example of the operation of the invention is illustrated in FIGS. 4-6. These figures illustrate a reticle image comprising vertical line 72 and horizontal line 78 superimposed on the target image 60. Particularly, FIG. 4 illustrates the superimposed image, as observed through the gun sight eyepiece 28, when the weapon 14 has been boresighted. As can be seen, an exemplary target such as that shown by the tank 60 has been centered within the field of view of the eyepiece 28. The intersection of the reticle lines 72 and 78 are similarly centered. The fire control system is then ready to be used to automatically determine the new position of the weapon 14, based upon various parameters or variables. The fire control system processor 34 can monitor various environmental sensors to gather data concerning cant, temperature, windage, barometric pressure, etc. The type of ammunition to be used can be manually input into the processor 34 to take into consideration the weight and velocity which is characteristic of that particular type of ammunition. The laser ranging equipment 44 can provide the processor 34 with electrical data corresponding to the distance between the target and the tank 12. While not shown, the range or distance may also be displayed in alphanumeric form to the gunner.

When the fire control system processor 34 has provided a solution to a conventional ballistic equation, an electrical output is provided to the reticle generator 30 to select and illuminate a particular vertical filament line 72 on azimuth array 64, and a particular horizontal filament line on elevation array 66.

Assuming that after considering the various input variables, the weapon barrel 14 should be directed above, and to the right of the target, a vertical reticle line 72 and a horizontal reticle line 78 will be selected such that the intersection thereof 110 will be displayed to the gunner, below, and to the left of the target image 60. This is shown in FIG. 5. In order to reposition the weapon 14 to the correct position, the weapon barrel 14 is moved upwardly, and to the right, until the reticle intersection 110 is aligned on the desired spot of the target image 60. According to the trajectory path calculated by the fire control system processor 34, a projectile fired from the weapon 14 should hit the target. In practical applications, the weapon 14 will always need to be raised, and moved to the right or left, in order to loft the projectile so that it can hit the desired target point.

Figure 7:
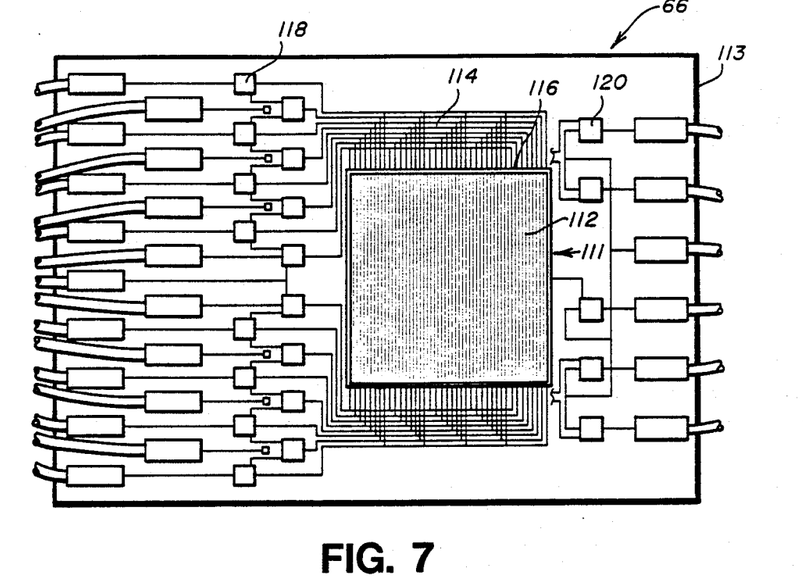
FIG. 7 is a planar view of the solid state LED array of the invention.

FIG. 7 illustrates the solid state reticle array 66 constructed in accordance with the invention. The LED array 66 is formed on a semiconductor chip 111 on which the material comprising the light emitting diode filament lines 112 are formed. The chip 111 is fixed to a semiconductor substrate 113, such as by an adhesive or other suitable bonding technique. The chip 111 is electrically connected to various conductors 114 on the substrate 113 by a plurality of chip bond pads 116. Each of the plurality of light emitting diode filament lines 112 can be illuminated independently of the others. External access conductors 118 and 120 are connected to particular ones of the chip bond pads 116. As will be described in more detail below, groups of the LED lines 112 are shorted together at one end thereof to facilitate the selection of a desired line in the array.

The solid state LED filament lines 112 are each formed as individual elongate light emitting diode segments. Thus, when a voltage is impressed across a line, energy is emitted from the material, as with conventional LED structures. In accordance with conventional light emitting diode fabrication techniques, the filament lines 112 can be constructed of gallium arsenide phosphide or gallium phosphide to emit visible light energy in the red and yellow spectrums. Gallium phosphide can be used as the light emitting diode material for emitting visible light in the green spectrum. Other materials can be utilized to provide light emitting functions.

In the preferred form of the invention, the solid state reticle array 66 comprises eighty lines 112, each of a 0.1 mil width and a spacing of 0.5 mils. The filament lines 112 are about one inch long. These dimensions are well within the capabilities of current semiconductor fabrication techniques. Moreover, with such a line spacing and width, a high resolution reticle can be generated and superimposed on the target image 60 to provide a highly accurate gun sighting device.

Figure 8:
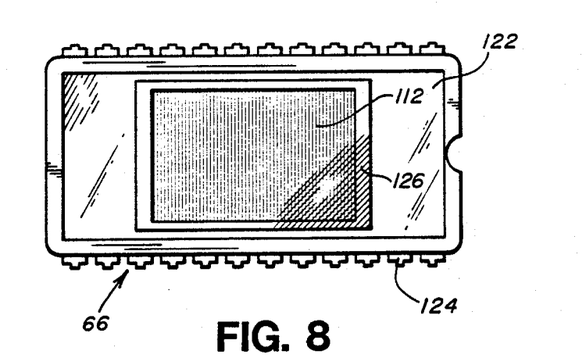
FIG. 8 is a planar view of a packaged integrated circuit of the solid state reticle array.

FIG. 8 illustrates the solid state reticle array 66 packaged in a conventional dual inline package 122. The package 122 may be constructed with a plastic or ceramic material with a plurality of connection terminals 124. The terminals 124 are connected internally to the external access conductors 118. The packaged array 66 includes a transparent window 126 through which the underlying filament lines 112 are exposed. The window 126 may be plastic or glass hermatically sealed to the package 122. The LED array 66 is shown in FIG. 8 with the LED lines 112 thereof oriented as shown with respect to the package 122. It should be understood that the azimuth LED array 64 is comparably constructed, but is turned 90° when fixed to the prism 76.

Figure 9:
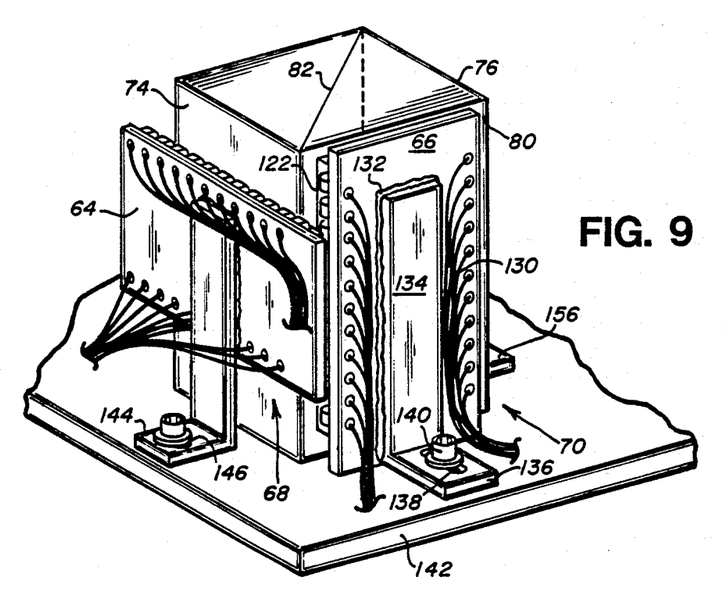
FIG. 9 is an isometric view of the components of the solid state reticle generator of the invention.

FIG. 9 illustrates the manner in which the azimuth and elevation arrays 64 and 66 are fixed with respect to the partially reflecting prism 76. The elevation array 66 package 122 is soldered or otherwise fixed to a printed circuit board 128, with printed wire conductors 130 forming an electrical connection between the integrated circuit terminals 124 and the wire bus 70. The azimuth array 64 is comparably constructed, but as noted above, is rotated 90° so that the LED lines are presented to the prism 76 in a vertical position.

The printed circuit board 128 of the elevation array 66 is cemented 132 to an "L" bracket 134. The L bracket 134 includes a base 136 with a slot 138. An adjustment screw 140 passes through the slot 138 into a threaded hole (not shown) in an optical table plate 142. When the elevation array 66 is properly oriented with respect to the face 80 of the prism 76, the screw 140 is tightened to thereby rigidly fix the elevation array 66 with respect to the prism 76.

The azimuth array 64 is fixed with respect to prism face 74 in a similar manner with an L bracket 144. The L bracket 144 may be formed with a channel on its back side to accommodate the electrical connections to the printed wire board holding the packaged array. The L bracket 144 includes a slot 146 which is formed orthogonal with respect to the slot 138 formed in the elevation array bracket 134. With this arrangement, the elevation array 66 can be adjusted back and forth, and the azimuth array 64 can be adjusted laterally with respect to the prism 76. While not shown, the other optical components shown in FIG. 3 can be mounted to the optical table 142 to rigidly fix each of the components with respect to each other to reduce the effects of vibration on the visual images generated and carried by the optical components.

Figure 10:
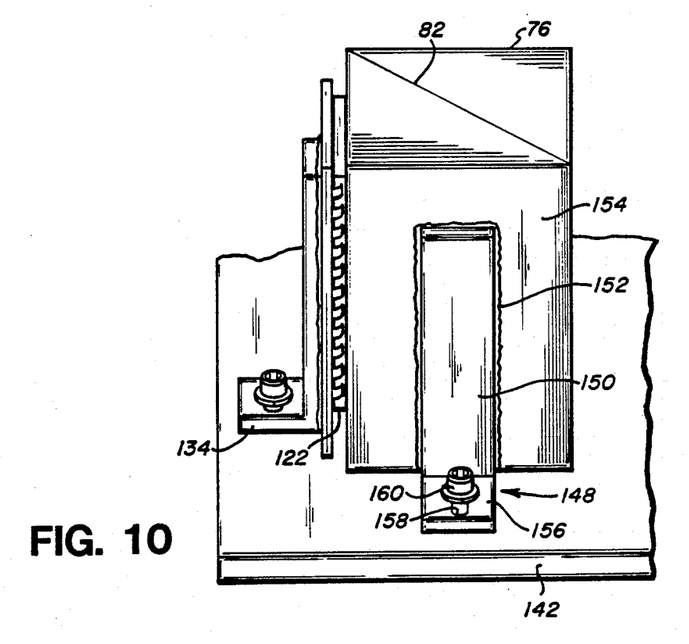
FIG. 10 is an isometric view of the partially reflecting prism mounting apparatus.

FIG. 10 illustrates the manner in which the partially reflecting prism 76 is fixed to the optical table 142. An angle bracket 148 has one leg 150 thereof cemented 152 to a face 154 of the prism 76. The other leg 156 of the angle bracket 148 includes an adjustment slot 158 through which an adjustment screw 160 passes. The optical table 142 includes a threaded hole (not shown) in which the screw 160 is secured when the prism 76 is properly oriented with respect to the azimuth and elevation reticle arrays 64 and 66.

In accordance with another important feature of the invention, the solid state reticle generator 30 can be constructed as a unit integral with the optical elements of the gun sight 10. Since the reticle generator 30 of the invention includes no moving parts, the unit need not be continually recalibrated, as is the case with the cathode ray tube type of reticle generators.

Figure 11:
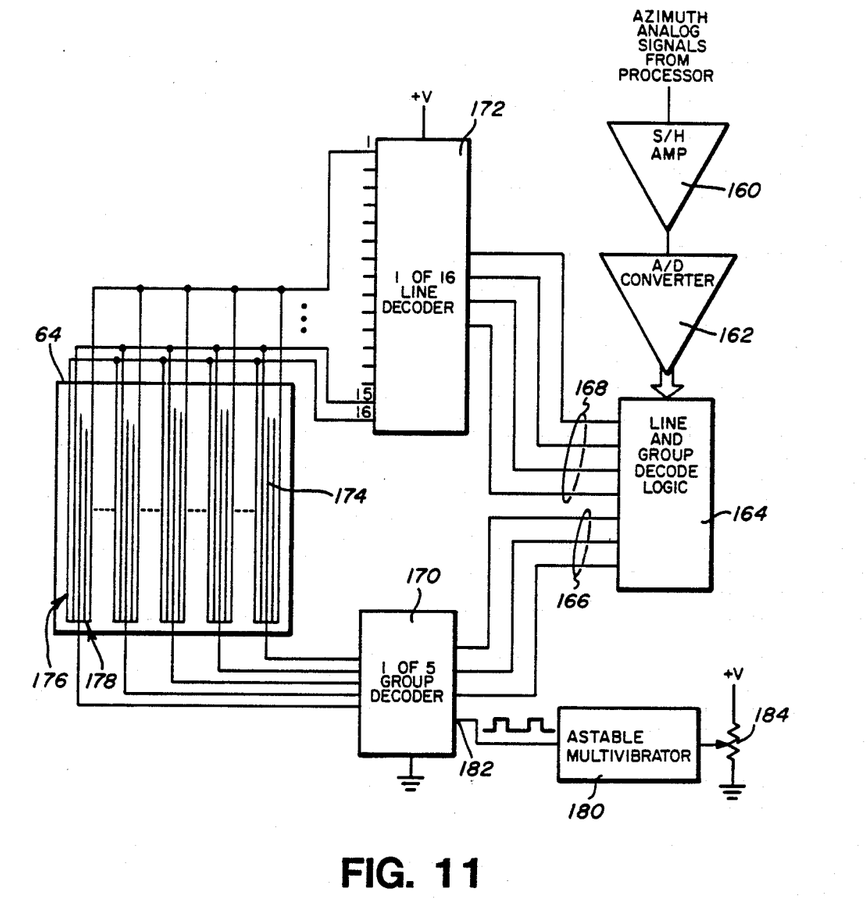
FIG. 11 is an electrical schematic of the circuits of the solid state reticle generator.

The decoding circuits for selecting a particular filament line of the azimuth array 64 are shown in FIG. 11. The corresponding selection of a filament line in the elevation array 66 is made in a comparable manner. The filament line select and decode circuits include a sample and hold amplifier 161 operating in conjunction with an analog-to-digital converter 162. The analog signals are output by the fire control processor 34, and are representative of solutions of a ballistic equation. The A/D converter 162 converts analog signals representative of the desired azimuth position of the weapon into corresponding digital signals. The digital signals output by the A/D converter 162 are applied to a line and group decode logic circuit 164. The line and group decode logic circuit 164 comprises combinational logic circuits which process the digital signals output by the A/D converter 162 to develop a 7-bit digital word which identifies a particular filament line to be illuminated in the azimuth array 64. The line and group decode logic 164 also comprises a logic interface for receiving the digital output of the A/D converter 162 and converting the same to a digital format to accommodate the electrical access scheme by which each filament line of the azimuth array 64 can be selected. In the preferred embodiment of the invention, the output of the A/D converter 162 comprises a digital word which is converted by the decode logic 164 into a 3-bit word on output 166, corresponding to a group of filament lines in array 64, and a 4-bit word on output 168 corresponding the particular filament line in the selected group.

The respective outputs of the line and group decode logic 164, comprising the group select 166 and line select 168, are connected to demultiplexers 170 and 172. Particularly, the group decode output 166 is connected to a one-of-five decoder 170. Similarly, the line decode outputs 168 is connected to a one-of-sixteen decoder 172. The decoder 172 may in practice constitute a pair of conventional one-of-eight demultiplexers connected together to form the one-of-sixteen selection.

The azimuth reticle array 64 of the invention comprises eighty light emitting diode filament lines 174 which are grouped in five groups of sixteen lines to each group. One group of sixteen lines is identified as reference character 176 in FIG. 11. The sixteen LED lines of group 176 are connected together at the bottom end 178, and connected to one output of the one-of-five decoder 170. The other four groups are comparably connected to corresponding outputs of the one-of-five decoder 170. Therefore, the selected output of the decoder 170 is operative to activate one of the five groups, each group having sixteen filament lines.

The one-of-sixteen decoder 172 comprises sixteen outputs, each of which is connected to the top end of one filament line in each of the noted groups. Thus, by using the one-of-sixteen decoder 172 and the one-of-five decoder 170, a single filament line of the azimuth array 64 can be selected by selecting a particular group, and a particular line within the selected group. Any one of the eighty filament lines can be selected and illuminated in this manner.

When the decoders are utilized as shown, the one-of-sixteen decoder 172 is of the type which supplies a voltage +V to the selected filament line, and does not supply a voltage to the nonselected lines. The one-of-five decoder 170 is of the type which grounds the selected group, and does not ground the nonselected groups. As a result, a selected filament line has a voltage impressed at the top thereof, and is grounded at the bottom to thereby illuminate such line.

In accordance with another important feature of the invention, an array illumination control is provided. Rather than varying the magnitude of the voltage which is applied to the selected array lines, the duty cycle of the selected array line is varied. By varying the duty cycle, the brightness of the array 160 lines can be controlled from vary dim intensities to full brightness. Because of the threshold voltage inherent in turning on a solid state LED, the lines can be illuminated with very dim intensities, without concern of the magnitude of the voltage required for turning on the LED devices.

The LED line intensities are controlled by an astable multivibrator 180 connected to the one-of-five decoder 170. The decoder 170 is preferably of the type having an input 182 which either places the outputs thereof in a high impedance state, or which disables the outputs so that all are at a logic high. Thus, the pulsed output of the astable multivibrator 180 cyclically activates the decoder 170 so that the desired group of LED lines are activated for only part of the time. The duty cycle of the astable multivibrator 180 is controlled by a potentiometer 184, which is effective to change the RC time constant associated with the multivibrator 180. The potentiometer 184 is manually adjustable, for example by a gunner, so that for evening or night conditions the reticle image illumination can be reduced. This prevents the target image 60 from being flooded and obscured by the superimposed reticle image. Also, by using LED material emitting a red light, the night vision of the gunner or gunsight operator is not affected, as might be the case with other colors.

From the foregoing, disclosed is a reticle generator which is light weight, has no moving parts and which is economically and easily manufactured. The reticle generator of the invention includes an azimuth array of vertical light emitting diode filament lines and an elevation array of horizontal light emitting diode filament lines. Each such array is fixed to right angled faces of a partially reflecting prism so that the visible light emitted by a selected line of both azimuth and elevation arrays results in a composite reticle for gun sight purposes.

The reticle image emitted from the partially reflecting prism is coupled through an optical path, including a relay prism, and is then superimposed on a target image. A gun sight operator can therefore observe both the target image and the reticle superimposed thereon.

The azimuth and elevation reticle arrays are each driven by respective decode circuits which receive signals from the fire control processor. The decode circuits convert azimuth and elevation analog signals into digital signals which are further decoded to drive the respective arrays to select a particular light emitting diode line in each of the azimuth and elevation arrays. The intersection of the selected lines in the azimuth and elevation arrays corresponds to the orientation of the weapon which must be assumed in order to perfect a strike or hit on the target. The azimuth and elevation arrays are driven with a variable duty cycle selection signal so that the illumination of a selected azimuth line and elevation line can be varied in intensity.

While the principles and concepts of the invention have been set forth above, it is to be understood that such a structure and method of fabrication are not limited by this disclosure. Therefore, while the preferred embodiment of the invention has been disclosed with reference to a specific reticle generator, it is to be understood that many changes may be made as a matter of engineering choices without departing from the spirit and scope of the invention as defined by the appended claims.

What is claimed is:

1. A reticle generator, comprising:
   a first array including a plurality of elongate, closely spaced light emitting diode filaments formed on a first substrate;
   a second array including a plurality of elongate closely spaced light emitting diode filaments formed on a second substrate;
   said first and second arrays each being individually encapsulated and having a transparent window through which light from the respective arrays is emitted;
   optical superimposing means comprising a prism structure with a first face oriented orthogonal to a second face thereof, a partially reflecting surface oriented at an angle with respect to said first and second faces, and a third face disposed in a plane parallel to one said first or second faces; and
   means for fixing the windowed part of said first array with respect to said first face of said prism, and for fixing the windowed part of said second array with respect to said second face of said prism to provide a reticle image having superimposed filament images of said first and second arrays exiting said third prism face.

2. The reticle generator of claim 1 wherein said first array is arranged with respect to said second array such that said elongated lines of each said array are oriented substantially orthogonal with respect to each other.

3. The reticle generator of claim 1 wherein said optical superimposing means defines a first optical superimposing means, and further including a second optical superimposing means for superimposing an image with said reticle image.

4. The reticle generator of claim 1 further including an analog-to-digital converter for converting analog signals representative of the coordinates of a spatial location into associated digital signals, and means for decoding said digital signals to access said first and second arrays to illuminate one said filament in each said array so that the intersection of said accessed filaments corresponds to said spatial location.

5. The reticle generator of claim 1 further including means for varying the intensity of the light emitted from the selected filament of each said array.

6. The reticle generator of claim 5 wherein said means for varying the light intensity includes manual means for providing any desired light intensity between a minimum and a maximum.

7. The reticle generator of claim 6 wherein said manual means comprises a variable resistor for controlling a pulse width output of an astable multivibrator.

8. The reticle generator of claim 1 further including an optical table, and means for fixing to said table said first and second encapsulated arrays and said prism structure.

9. The reticle generator of claim 8 further including means for adjusting said first and second arrays with respect to said prism structure.

10. A reticle array device, comprising:
a semiconductor substrate;
a plurality of elongate, parallel spaced filament lines of material formed on said substrate which can be illuminated when a voltage is impressed thereacross;
a plurality of groups of said lines of material defined by an electrical short circuit at the end of each said group of lines;
a first plurality of access conductors connected to one end of ones of said lines, and a second plurality of access conductors each connected to one said short circuited group; and
encapsulating means for housing said substrate for protection from the environment;
a plurality of electrical terminals connected to said filament lines and extending from said encapsulating means; and
a transparent window cover sealed by said encapsulating means, and disposed adjacent to said filament lines so that light emitted from said lines can be transmitted through said window cover.

11. The reticle array of claim 10 wherein said filament lines are formed with a width of about 0.1 mils.

12. The reticle array of claim 10 wherein said filament lines are spaced about 0.5 mils apart.

13. A reticle generator, comprising:
a plurality of azimuth light emitting diode filament lines;
a plurality of elevation light emitting diode filament lines;
means for selectively driving one said azimuth filament line and one said elevation filament line at a time with a voltage; and
an illumination control for said azimuth and elevation filament lines, comprising means for varying a duty cycle of said voltage to obtain a continiuum of illuminations between a minimum and maximum, said control including a variable resistance for controlling the duty cycle of a multivibrator.

14. The reticle generator of claim 13 wherein said illumination control further comprises a demultiplexer with a control input adapted for activating a plurality of outputs connected to said azimuth and elevation filament lines, and means for cyclically driving said control input.

* * * * *